Jan. 21, 1964    S. A. CARSWELL    3,118,386
MULTI-STAGE CENTRIFUGAL PUMP
Filed Oct. 20, 1961    2 Sheets-Sheet 1

INVENTOR
SAMUEL A. CARSWELL
BY
Frank J. Jordan
HIS ATTORNEY

Jan. 21, 1964   S. A. CARSWELL   3,118,386
MULTI-STAGE CENTRIFUGAL PUMP
Filed Oct. 20, 1961   2 Sheets-Sheet 2

INVENTOR
SAMUEL A. CARSWELL
BY
Frank J. Jordan
HIS ATTORNEY

# United States Patent Office 3,118,386
Patented Jan. 21, 1964

3,118,386
MULTI-STAGE CENTRIFUGAL PUMP
Samuel Allen Carswell, Dunellen, N.J., assignor to Ingersoll-Rand Company, New York, N.Y., a corporation of New Jersey
Filed Oct. 20, 1961, Ser. No. 146,597
6 Claims. (Cl. 103—97)

The present invention relates to a multi-stage centrifugal pump, and more particularly to a pressure control device for a multi-stage centrifugal pump having more than one suction or discharge conduits.

Heretofore, the discharge from fluid pumps has been controlled by a regulating valve installed in the conduit leading from the pump discharge. On this known arrangement, a multi-stage centrifugal pump is driven by a constant speed motor and a regulating valve installed on the discharge conduit of the pump is used to control the pressure and flow from the pump as the pump operates at constant speed. This system has certain disadvantages in that it becomes necessary to partially close the regulating valve in order to decrease the flow thus causing an unsatisfactory high pressure drop in the partially closed regulating valve. Also the additional work required for passing the pump fluid through the partially closed regulator valve is lost.

On certain applications, such as for example a boiler feed pump installation, the cost of maintaining such a regulating valve which is subject to high temperatures and pressures may be very expensive. These high temperatures and high pressure drops across such a valve magnify the maintenance problem. Also on such an installation, the failure of such a valve due to malfunctioning or wear may necessitate the shutting down of the entire boiler plant in order to repair the valve. Further on such an installation, the regulating valve is often throttled down at normal operating conditions in order to provide reserve capacity to handle surges. Since the pump is driven by a constant speed motor the speed cannot be increased to handle such surges. For example, when an additional turbine generator unit is put on the line, the boiler to which the feed pump discharges, is required to produce the additional steam for driving the added turbine generator unit. The boiler feed system in turn is required to be able to handle this additional load which requires delivery of additional feed water to the boiler when the turbine is put on the line. Therefore, under normal operating conditions the regulating valve is at a partially closed position in order that it may be possible to further open the valve to provide the additional flow to meet the added load requirement when the added turbine unit is put on the line.

On other known arrangements, a variable speed coupling may be used between the driving motor and the pump. On such a system the discharge of the pump is controlled by varying the speed of the pump. However, this system also has several disadvantages such as for example the initial high cost of the variable speed coupling. Very frequently the variable speed coupling requires auxiliaries to keep it operating and these auxiliaries along with the coupling itself require additional floor space and provide additional equipment to maintain. Furthermore, these couplings contain moving parts which dissipate energy thereby decreasing the total power available from the prime mover for driving the pump.

It is the general object of the present invention to avoid and overcome the foregoing and other difficulties of and objections to prior-art practices by the provision in a pump of a pressure control device for providing more than one discharge pressure for such pump.

Another object of the present invention is the provision of a pressure control device for controlling the fluid pressure from a plurality of discharge nozzles.

Still another object of the present invention is the provision of a pressure control device which reduces the pressure drop across a regulating valve located on the discharge conduit leading from the pump.

A further object of the present invention is to reduce the total maintenance expense required to maintain a regulating valve located on the discharge conduit leading from the pump.

Still a further object of the present invention is the provision of a pressure control device for controlling the pump discharge which system requires less power.

The aforesaid objects of the present invention and other objects which will become apparent as the description proceeds are achieved by a pressure control device comprising discharge means connected to the final impeller of a multi-stage centrifugal pump wherein the discharge means is adapted to receive fluid from the final impeller. The device also includes an intermediate discharge means in communication with an intermediate impeller and adapted to receive fluid from an intermediate impeller. Under normal operating conditions the discharge pressure in the intermediate discharge means is less than the discharge pressure in the discharge means receiving fluid from the final impeller. Valve means are connected to both discharge means to provide a plurality of discharge pressures.

For a better understanding of the present invention reference should be had to the accompanying drawings, wherein like numerals of reference indicate similar parts throughout the several views and wherein.

Although the principles of the present invention are broadly applicable to any multi-stage centrifugal pump, the present invention is particularly adapted for use as a boiler feed pump and hence it has been so illustrated and will be so described.

Figure 1:
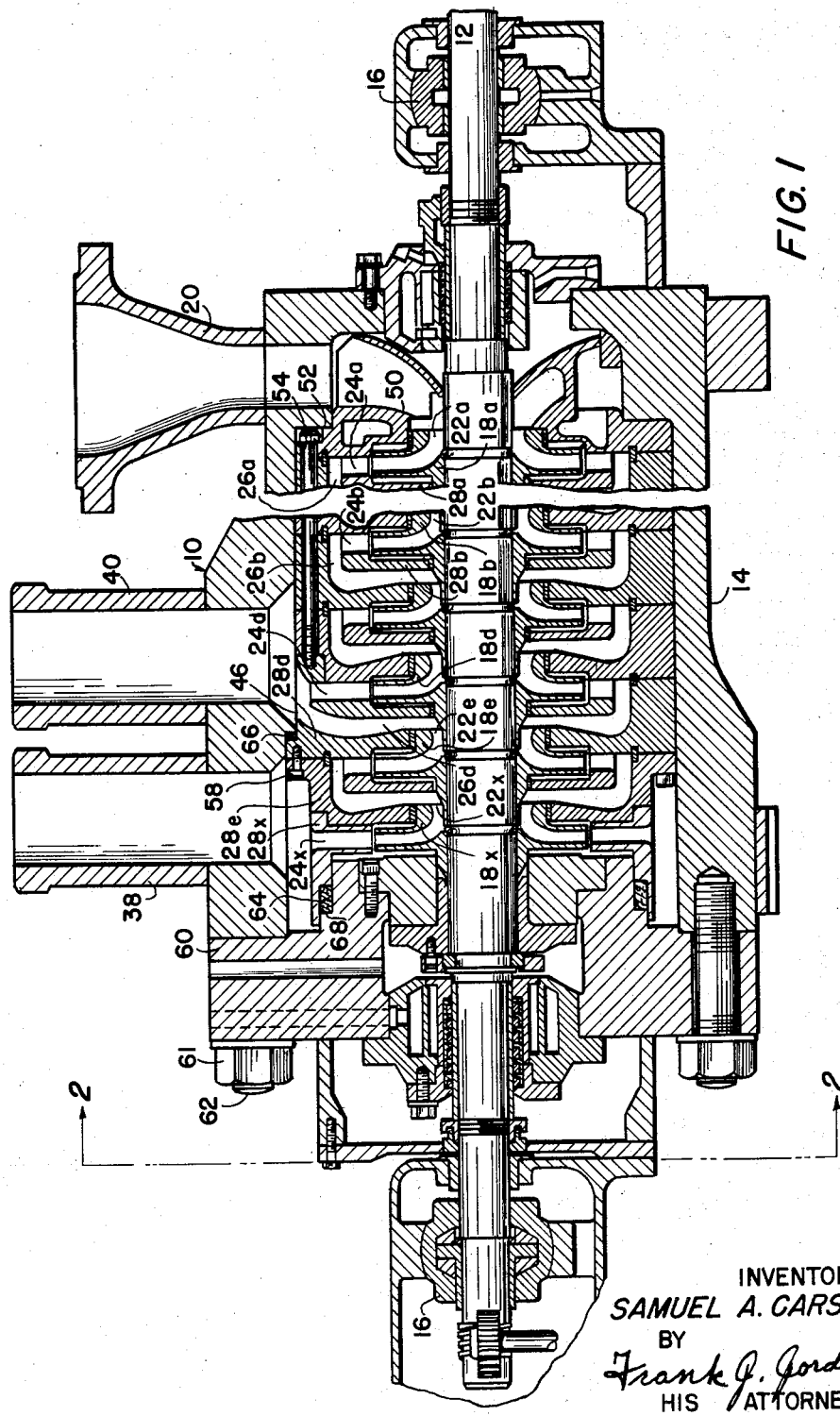
FIG. 1 is a longitudinal cross sectional view of a multi-stage centrifugal pump having two discharge nozzles.
Figure 3:
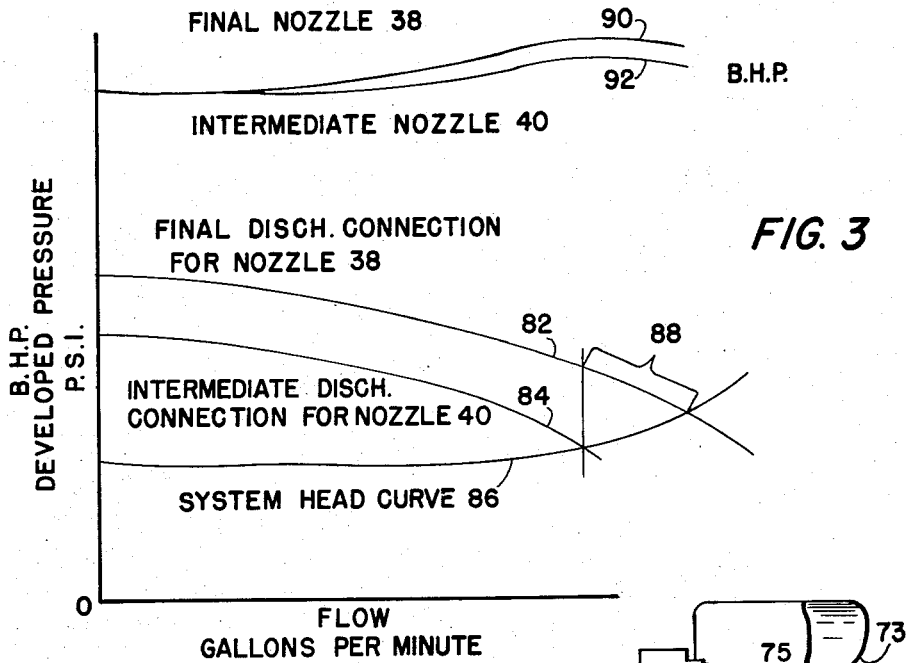
FIG. 3 is a graph showing several operating curves of a pump having multi-discharge nozzles.

Since the general construction and operation of a multi-stage centrifugal pump 10 as shown in FIG. 1 is generally well known to those skilled in the art and thus forms no part of the present invention, a general rather than a detailed description of the operation and construction of the pump is deemed sufficient.

In FIG. 1 a shaft 12 is shown extending through the pump casing 14 and is supported at each end by bearings 16. Adapted to rotate with the shaft 12 are a plurality of impellers 18 which are used to increase the pressure of the fluid.

The fluid to the pump 10 enters the inlet nozzle 20 and passes to the eye 22a of the first stage impeller 18a. The fluid is passed from one stage of the pump 10 to the next stage by means of passageways 26 located in channel members 28 adjacent to each impeller 18.

The fluid is discharged from the outer periphery of the first stage impeller 18a and passes through a first stage diffuser 24a into a passageway 26a in a closed channel member 28a. The passageway 26a leads to the eye 22b of the second stage impeller 18b and the same flow path is repeated through the various stages of the pump. Of course, the pressure of the fluid being handled is increased as it passes through each pump stage. As the pump fluid reaches the final stage of the pump 10, it enters the eye 22x of the last stage impeller 18x and after passing through the final stage diffuser 24x enters a discharge means, such as a final discharge nozzle 38, connected to the final impeller 18x and adapted to receive fluid from the final impeller 18x.

For obtaining pump discharge pressures less than that developed in the final stage of the pump 10, intermediate discharge means are provided to conduct the pump fluid from an intermediate stage of the pump 10. In the particular embodiment illustrated in FIG. 1, an intermediate discharge means, such as an intermediate discharge nozzle 40 is shown located two stages away from the last stage of the pump 10. Since the pressure of the fluid is increased as it passes through each stage, the pressure at the intermediate discharge nozzle 40 will be less than the pressure at the final discharge nozzle 38.

The intermediate channel member 28d adjacent to the intermediate discharge nozzle 40 is not closed off at its outer periphery as are the channel members 28a, 28b, etc. of the other stages, and such channel member 28d has an opening 46 leading directly into the intermediate discharge nozzle 40. Also the diffuser 24d at this intermediate channel member 28d is longer than the other diffusers 24a, 24b, etc. in order to reduce the turbulence of the fluid as it passes from the impeller 18d into the intermediate discharge nozzle 40. Furthermore, the passageway 26d in the channel member 28d connects the opening 46 to the eye 22e of the next stage impeller 18e. Thus, where the passageway 26a in the first stage channel member 28a extends directly from the diffuser 24a to the eye or inlet 22b of the next stage impeller 18b, the arrangement of the channel member 28d at the intermediate stage discharge nozzle 40 is different in that the passageway 26d in channel member 28d extends from the opening 46 into the eye 22e of the next stage impeller 18e. Thus the first stage channel member 28a is a closed channel member while the intermediate channel member 28d is an open channel member.

The channel members are arranged in the pump casing 14 adjacent to each other and have surfaces which are in face-to-face contact with one another thereby preventing fluid flow therebetween. The first stage channel member 28a has a surface 52 which abuts against a mating surface on the pump casing 14. In the embodiment shown in FIG. 1, all the channel members 28a, 28b, 28c, etc. except the channel members 28e, 28x in the last two stages of the pump are held in abutting face-to-face contact by a threaded bolt 54 extending into each such channel member. Since the diffuser 24d and passageway 26d in the intermediate channel member 28d communicate directly with the intermediate discharge nozzle 40, the end of the bolt 54 terminates within the channel member 28d since if it passed completely through the channel member 28d it would obstruct the passageway 26d and it would also prevent the use of the longer diffuser 24d shown in FIG. 1. Since the channel members 28a, 28b, etc. have to be held in face-to-face contact with one another in order to prevent fluid flow therebetween, some sort of holding means must be provided for holding all of them in this position. Consequently, the channel member 28e adjacent to the final stage of the pump, is held to the intermediate channel member 28d by a bolt 58. Thus by means of the bolts 54 and 58 all the channel members are held together as a single unit since both bolts 54, 58 are threaded into the same intermediate channel member 28d.

The channel members 28a, 28b, etc. are held in the pump casing 14 by an end plate 60 which end plate 60 is bolted to the pump casing 14 by means of studs 62. When the end plate 60 is secured on the casing 14 by the studs 62, a surface 68 on the end plate 60 is made to bear on a flexible packing 64 which in turn exerts a force on all the abutting channel members since the first stage member 50 is abutted solidly against the casing 14 at the surface 52. Thus it can be seen that the end plate 60 holds all the channel members within the pump casing 14 in face-to-face contact.

In order to provide a seal between the final discharge nozzle 38 and the intermediate discharge nozzle 40, an additional flexible seal packing 66 is employed. The channel member 28d is permitted to move slightly longitudinally as the flexible seal 66 is compressed by the nuts 61 being tightened down on the end plate 60. Because of this permissive longitudinal movement all the channel members will be forced tightly against one another when the end plate 60 is secured on the pump casing 14.

Figure 2:
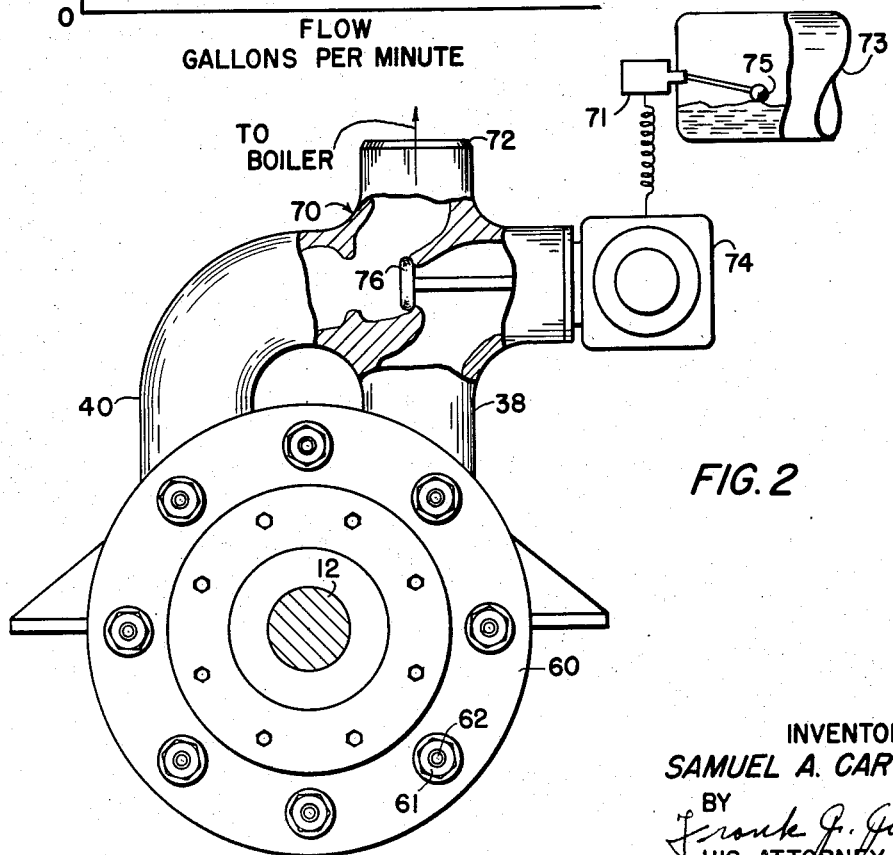
FIG. 2 is a vertical sectional view along the line 2—2 of FIG. 1 in the direction of the arrows showing a three-way valve at the intersection of the conduits leading from the two nozzles and a control means for the valve.

Since in many cases it is desirable to employ only one discharge line such as for example a feed line to a boiler drum, the flow from the two discharge nozzles 38, 40 of the pump 10 may be connected to a single discharge conduit 72 through valve means such as the multi-way valve 70 shown in FIG. 2. With such an arrangement the pressure and flow in the conduit 72 leading to the boiler drum 73 will be a combination of the pressure and flow in the final discharge nozzle 38 and in the intermediate discharge nozzle 40.

One convenient manner of controlling the flow from the pump 10 to the boiler drum 73, and thereby make the output of the pump 10 responsive to the water, and changes in the water level demands of the boiler drum 73, is to employ the multi-way valve 70 shown in FIGURE 2. To this end a water level regulator 71 is connected to the boiler drum 73 and is provided with a float 75 which rests on the water within the boiler drum 73. In order to make the multi-way valve 70 respond to the fluid level in the boiler drum 73, the water level regulator 71 is connected to an electric motor 74 which will control the position of a valve member 76 which is disposed in the multi-way valve 70. The combination of the float 75, the regulator 71 and the motor 74 form a control device.

It is clear that the position of the float 75 is a function of the water level within the boiler drum 73 and that such a water level is a function of the rate of evaporation of the boiler and the rate of water flow into the boiler drum 73. If there is an increased demand on the boiler, that is an increase in the rate of evaporation within the boiler drum 73, the water level within the boiler drum will drop thereby causing the float 75 to drop. The increased rate of evaporation will require an increased flow to the boiler drum 73, which will result in a greater discharge pressure requirement at the discharge conduit 72. This increased pressure is required because it is obvious from prior art practices that an increase in flow will require a greater pressure from the pump 10 to overcome the friction losses in the conduits (not shown) connecting the pump 10 to the boiler drum 75. To this end the multi-way valve 70 is actuated so that the valve member 76 responds to the change in the water level in the boiler drum through the operation of the water level regulator 71, the motor 74 and the positioning of the valve member 76.

Structurally, the motor 74 controls the position of the valve member 76 in the multi-way valve 70, however it is clear that the actuation of the motor 74 is a function of the change in position of the float 75 within the boiler drum 73. The positioning of the valve member 76 will allow an infinite number of changes in pressure between the minimum of intermediate discharge pressure and the maximum of final discharge pressure.

Under normal operating conditions the motorized valve 70 is in the position shown in FIG. 2 and in this position the pressure drop through the valve 70 is at a minimum. When increased demand is placed on the pump 10, the valve 70 will be actuated to supply the additional pressure and flow requirements from the high pressure nozzle 38 to meet the increased demand.

To better understand the operation of the novel arrangement of the present invention, a set of operating curves is shown in FIG. 4. This set of curves is particularly applicable to a pump 10 being used on a boiler feed installation. The pressure-flow relationship in the final discharge nozzle 38 and the intermediate discharge nozzle 40 of the pump 10 are indicated by the curves 82 and 84 respectively. The pressure-flow requirements which the pump 10 is required to develop to meet the particular requirements of the installation is indicated by the curve 86, which curve 86 is called the system head curve.

As previously explained under normal operating conditions the pump 10 will discharge through the intermediate discharge connection 40 and the pump 10 will operate at the intersection of the curves 84 and 86. If there should be a demand for increased pressure or flow the intermediate discharge connection 40 will be closed off by the multi-way valve 70 and the flow will be from the final discharge connection 38. Consequently, the pump will then operate somewhere along the section 88 of the curve 82. While operating at a point on the section 88 of the curve 82, the pressure drop through the multi-way valve 70 will be relatively high as represented by the vertical distance (or difference in the ordinates) between the final discharge connection curve 82 and the system head curve 86. Since it is not expected that this high load condition will last for any length of time this high pressure drop is not of prime importance. Whatever caused this increase load requirement will eventually be eliminated so that the pump 10 can then normally operate at the intersection of the curves 84 and 86.

As the flow delivered by the pump 10 is decreased below the point of normal operation (i.e. the intersection of curves 84 and 86), the vertical distance between the intermediate discharge connection curve 84 and the system head curve 86 is less than the distance between the final discharge connection curve 82 and the system head curve 86. Thus it can be seen that the total pressure drop which the pump 10 has to overcome will be much less when operating on the intermediate discharge connection (i.e. nozzle 40) at normal operation or at a flow below normal operation. Under such normal or low flow operating conditions the total pressure drop which the pump 10 has to overcome will be at a minimum.

The horsepower requirement while discharging through the intermediate and final discharge nozzles 38, 40 is represented by the curves 90, 92 respectively. It will be noted from these power requirement curves 90, 92 that the horsepower requirements in brake horsepower (B.H.P.) for driving the pump 10 are less when the pump 10 is discharging through the intermediate nozzle 40.

It will be understood by those skilled in the art that alternatively instead of using the intermediate nozzle 40 as a discharge conduit, it may also be used as a suction nozzle on those applications where the pump 10 is being used for vacuum service. In such applications the pump 10 may produce various levels of vacuum instead of levels of discharge pressure.

It will be recognized by those skilled in the art that the objects of the present invention have been achieved by the provision of pressure control device which provides more than one discharge pressure to thereby increase the overall efficiency of the pump; which controls the fluid pressure from a plurality of discharge nozzles; which reduces the total pressure drop which the pump has to overcome; and which reduces maintenance expense due to wear and tear on valves due to high pressure drops through the valves.

While in accordance with the patent statutes one best known embodiment of the present invention has been illustrated and described in detail, it is to be particularly understood that the invention is not limited thereto or thereby.

I claim:

1. In combination with a boiler drum having a fluctuating water level therein, a centrifugal pump having a frame means, a series of impellers for progressively increasing the pressure of a fluid passing through said pump within said frame means, said pump being provided with an intermediate impeller and a final impeller, intermediate discharge means in communication with said intermediate impeller for receiving fluid from said intermediate impeller, final discharge means in communication with said final impeller for receiving fluid from said final impeller, the discharge from said intermediate discharge means under operating conditions being less than the discharge of said final discharge means, a pressure control device connected to said intermediate discharge means and said final discharge means for providing a plurality of discharge pressures, and control means connected to said pressure control device for initiating a signal responsive to the change in the fluid level in said boiler drum, said pressure control device being responsive to said signal.

2. The pressure control device recited in claim 1 wherein said pressure control device comprises a valve having a first inlet connection from said final discharge means, a second inlet connection from said intermediate discharge means, an outlet connection for conducting a single flow, and a movable valve member operable to prevent fluid flow from said discharge means or said intermediate discharge means, said movable valve member being operable to regulate the proportion of flow between said final discharge means and said intermediate discharge means.

3. The pressure control device recited in claim 1 wherein said pressure control device comprises a valve provided with a movable valve member and an outlet means, said control means being operatively connected to said movable valve member and responsive to the change in the fluid level in said boiler drum for controlling the pressure and flow of said fluid from said final discharge means and said intermediate discharge means.

4. In combination with a boiler drum having a fluctuating water level therein, a centrifugal pump having a frame means, a series of impellers for progressively increasing the pressure of a fluid passing through said pump within said frame means, said pump being provided with an intermediate impeller and a final impeller, intermediate discharge means connected to said intermediate impeller for receiving fluid from said intermediate impeller, final discharge means connected to said final impeller for receiving fluid from said final impeller, a pressure control device comprising a multi-way valve provided with a plurality of inlet means connected to said final discharge means and said intermediate discharge means, and control means communicating with said multi-way valve for controlling the proportion of flow of the final discharge means and the intermediate discharge means from said multi-way valve.

5. The pressure control device recited in claim 4 wherein a control means is provided to actuate said multi-way valve in response to changes in the fluid level in said boiler drum.

6. In combination with a boiler drum having a fluctuating water level therein, a centrifugal pump having a frame means, a series of impellers for progressively increasing the pressure of fluid passing through said pump within said frame means, said pump being provided with an intermediate impeller and a final impeller, intermediate discharge means in communication with said intermediate impeller for receiving fluid from said intermediate impeller, final discharge means in communication with said final impeller for receiving fluid from said final impeller, a multi-way valve connected to said intermediate and final discharge means and being provided with an outlet means, a valve member disposed within said multi-way valve and operable to vary the pressure and flow through said multi-way valve between said intermediate pressure and said final pressure, a float disposed within said boiler drum and floating on the water disposed therein, a water level regulator connected to said float for generating a signal when said float moves in accordance with said fluctuating water level, and an electric motor connected to said water level regulator and said valve member to operate said valve member in accordance with the signals received from said water level regulator, the pressure at said outlet means being dependent upon the position of said valve member.

References Cited in the file of this patent

UNITED STATES PATENTS

| | | | |
|---|---|---|---|
| 1,111,498 | Rotter | Sept. 22, | 1914 |
| 1,262,527 | Loewenstein | Apr. 9, | 1918 |
| 2,002,254 | Treloar | May 21, | 1935 |
| 2,072,467 | Nore | Mar. 2, | 1937 |
| 2,380,606 | Moody | July 31, | 1945 |
| 2,399,046 | Larrecq | Apr. 23, | 1946 |
| 2,426,909 | Waterman | Sept. 2, | 1947 |
| 2,660,121 | Curtis et al. | Nov. 24, | 1953 |
| 2,932,444 | Walker | Apr. 12, | 1960 |

FOREIGN PATENTS

| | | | |
|---|---|---|---|
| 296,477 | Germany | Jan. 24, | 1915 |
| 347,397 | Germany | June 19, | 1921 |
| 386,814 | Great Britain | Jan. 26, | 1933 |
| 806,219 | Great Britain | Dec. 23, | 1958 |